United States Patent Office 3,151,135
Patented Sept. 29, 1964

3,151,135
9-HALO-12-ALKYL-11-OXYGENATED PROGESTERONES
Gordon H. Thomas, Birmingham, England, and Josef Fried, Princeton, N.J., assignors to Olin Mathieson Chemical Corporation, New York, N.Y., a corporation of Virginia
No Drawing. Filed Sept. 18, 1962, Ser. No. 224,529
4 Claims. (Cl. 260—397.45)

This application is a continuation-in-part of our application, Serial No. 860,733, filed December 21, 1959, now abandoned, which in turn is a continuation-in-part of our application, Serial No. 711,779, filed January 29, 1958, and now abandoned.

This invention relates to the synthesis of steroids and has for its object the provision of new steroids of the general formula

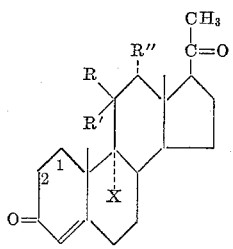

wherein the 1,2-position is saturated or double-bonded, R is hydrogen, R' is β-hydroxy or together R and R' is keto, R" is lower alkyl (preferably methyl), and X is halogen; a process for preparing these new steroids; and new intermediates useful in said preparation.

The new 9α-halo steroids of this invention are prepared by a series of steps which comprises: (a) interacting a steroid of the general formula

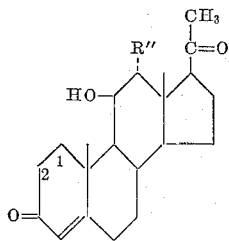

wherein the 1,2-position is saturated or double-bonded, and R" is as above defined, with a lower alkane sulfonyl halide at an elevated temperature in the presence of an organic base to yield the corresponding 9(11)-dehydro derivative; (b) treating the 9(11)-dehydro derivative thus formed with a hydroxybrominating, hydroxychlorinating or hydroxyiodating agent to yield the corresponding 9α-bromo (or 9α-chloro or 9α-iodo) 11β-hydroxy derivative; (c) either oxidizing the 9α-bromo (or 9α-chloro or 9α-iodo) 11β-hydroxy derivative thus formed, if desired, to the corresponding 11-keto derivative, or treating with the salt of a strong base and weak acid to yield the corresponding 9β,11β-epoxy derivative; (d) treating the 9β,11β-epoxy derivative with a hydrogen halide to yield a 9α-halo 11β-hydroxy derivative; and (e) if desired, oxidizing the 9α-halo 11β-hydroxy derivative to the 9α-halo 11-keto derivative.

Among the suitable steroid reactants utilizable in the process of this invention may be mentioned the 12α-(lower alkyl)-11β-hydroxy-progesterones (e.g. 12α-methyl-11β-hydroxyprogesterone and 12α-ethyl-11β-hydroxyprogesterone) and the 12α-(lower alkyl)-Δ¹,⁴-pregnadiene-11β-ol-3,20-diones (e.g. 12α-methyl-Δ¹,⁴-pregnadiene-11β-ol-3,20-dione), which can be prepared by the process disclosed in our U.S. applications, Serial No. 696,904, filed November 18, 1957, now abandoned and Serial No. 847,459, filed October 20, 1959, now abandoned.

The series of reactions employed in the process of this invention is illustrated by the following equations employing 12α-methyl-11β-hydroxyprogesterone as the starting material:

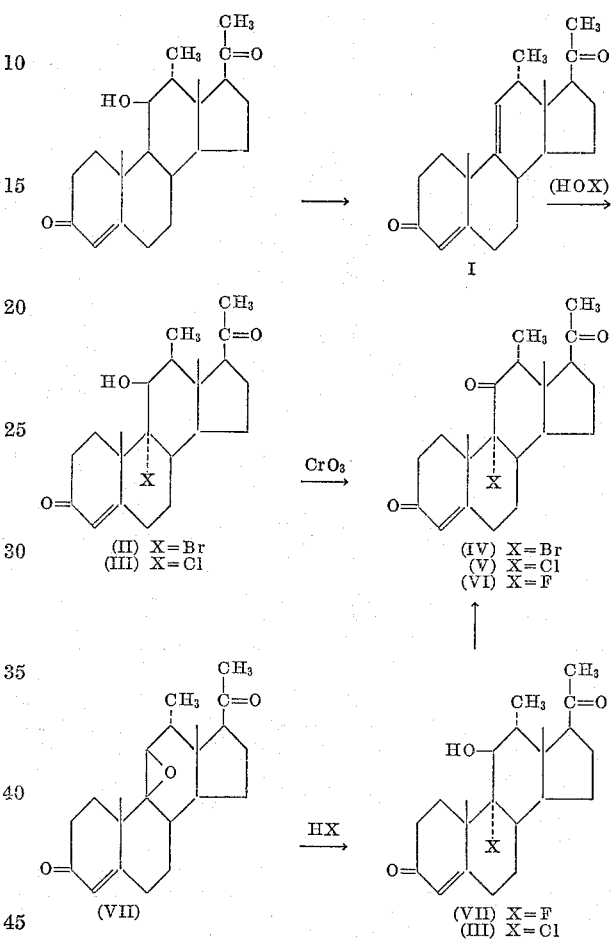

To prepare the new 9(11)-dehydro intermediates of this invention one of the starting steroids is interacted with a lower alkane sulfonyl halide (e.g. mesyl chloride) at an elevated temperature in the presence of an organic base, such as pyridine, the reaction preferably being conducted in an organic solvent of high dielectric constant such as dimethylformamide for the steroid reactant.

The 9(11)-dehydro intermediate thus formed is then treated with a brominating or chlorinating agent in the presence of water and an acid of low nucleophilicity (e.g. perchloric acid). The preferred brominating agents are N-bromamides and N-bromimides of carboxylic acids. Suitable brominating agents include the N-bromamides of lower alkanoic acids (e.g., N-bromacetamide), the N-bromimides of lower alkanedioic acids (e.g. N-bromosuccinimide), and dibromodimethylhydantoin. Suitable chlorinating agents include the chloro analogues of the bromo compounds listed hereinbefore. The reaction is preferably conducted in an aqueous inert organic solvent, such as an alcohol or ether.

The reaction results in the production of a 9α-bromo (or chloro) 11β-hydroxy steroid, which can then either be oxidized by treatment with an oxidizing agent such as a hexavalent chromium compound (e.g. chromic acid) to the corresponding 9α-bromo (or chloro) 11-keto derivative; or converted to the corresponding 9β,11β-epoxy derivative by treatment with a basic reagent such as an alkali metal salt of a lower fatty acid in a lower alcohol (e.g. an alkali metal acetate in ethanol), or with an alkali metal carbonate, dicarbonate, or hydroxide.

The 9β,11β-epoxy derivative can then be converted to the corresponding 9α-halo-11β-hydroxy derivative by treatment with the desired hydrogen halide (i.e. hydroiodic acid, hydrobromic acid, and preferably hydrochloric acid and hydrofluoric acid). These 9α-halo-11β-hydroxy derivatives can in turn, if desired, be oxidized to the corresponding 9α-halo-11-keto derivatives by treatment with an oxidizing agent such as a hexavalent chromium compound (e.g. chromic acid).

The 9α-halo-11β-hydroxy (or 11-keto) steroids of this invention are physiologically active compounds which possess anti-inflammatory and especially progestational activity. Thus, these new steroids of this invention can be administered instead of, and in the same manner as progesterone in the treatment of uterine bleeding. It has been surprisingly found that the 12α-alkylated steroids of this invention are many times more active as progestational agents than are the corresponding 12-unsubstituted derivatives. Thus, whereas 9α-chloro-11β-hydroxy-progesterone possesses one-fourth the activity of progesterone in the Clauberg (McPhail) modification immature rabbit uterus test, 12α-methyl-9α-chloro-11β-hydroxyprogesterone has the same to twice the activity of progesterone in the same test. 12α-methyl-9α-chloro-11β-hydroxyprogesterone is, therefore, four to eight times more active a progestational agent than is 9α-chloro-11β-hydroxyprogesterone.

The following examples illustrate the preparation of the starting materials used in the process of this invention (all temperatures being in centigrade):

EXAMPLE A

*12α-Methyl-11-Ketoprogesterone 3,20-Bisethylene Ketal*

(a) *Preparation of 9α-fluoro-11-ketoprogesterone 3,20-bis-ethylene ketal.*—A mixture of 10 g. of 9α-fluoro-11-ketoprogesterone, 350 ml. of benzene, 80 ml. of ethylene glycol and 200 mg. of paratoluene-sulfonic acid monohydrate is refluxed with stirring for 72 hours. The reaction mixture is then cooled to room temperature and neutralized with sodium bicarbonate solution. The phases are separated and the aqueous layer reextracted with additional amounts of benzene. The combined benzene extracts are washed with water, dried over sodium sulfate and evaporated to dryness in vacuo. The crude residue on crystallization from acetone-hexane yields about 11 g. of the essentially pure bis-ethylene ketal melting at about 179–182°. Recrystallization of this material from methanol gives an analytical sample melting at about 189–190°.

(b) *Preparation of 12α-methyl-11-ketoprogesterone 3,20-bis-ethylene ketal.*—A solution of 9α-fluoro-11-ketoprogesterone 3,20-bis-ethylene ketal (10 g.) in benzene (100 ml.) is treated with an ethereal solution of lithium methyl (150 ml., 13.5 mg. of lithium metal/ml.). The solution is stirred for 4 hours at room temperature and then the excess lithium methyl is decomposed by the addition of ice. Chloroform (300 ml.) is added, and the mixture is washed several times with water, dried over sodium sulfate and evaporated in vacuo. Trituration of the residue with hexane gives about 4.2 g. of 12α-methyl-11-ketoprogesterone 3.20-bis-ethylene ketal, M.P. about 135–138°. A second crop of crystals (about 2.4 g., M.P. about 124–130°) is obtained on concentrating the hexane mother liquor. Crystallization from methanol gives an analytical sample melting at about 139–142°.

Similarly, by substituting an equivalent amount of lithium ethyl for the lithium methyl in the procedure of Example A, 12α-ethyl-11-ketoprogesterone 3,20-bis-ethylene ketal is obtained.

EXAMPLE B

*12α-Methyl-Δ$^{1,4}$-Pregnadiene-3,11,20-Trione 3,20-Bis-Ethylene Ketal*

By substituting an equal amount of 9α-fluoro-Δ$^{1,4}$-pregnadiene-3,11,20-trione for the steroid reactant in the procedures of Example A, 12α-methyl-Δ$^{1,4}$-pregnadiene-3,11,20-trione, 3,20-bis-ethylene ketal is obtained.

EXAMPLE C

*12α-Methyl-11β-Hydroxyprogesterone 3,20-Bis-Ethylene Ketal*

A solution of 1 g. of 12α-methyl-11-ketoprogesterone 3,20-bis-ethylene ketal is 50 ml. of dry tetrahydrofuran is heated under reflux with 1 g. of lithium aluminum hydride for 18 hours. Ice is added to the cooled solution to decompose excess reagent and then a saturated aqueous solution of sodium sulfate is added with stirring until the precipitated aluminum salts are formed into a slurry. The clear ether solution is decanted off and the inorganic material is washed twice with chloroform. The combined organic extracts are dried over sodium sulfate and then evaporated in vacuo. The residue is dissolved in 10 ml. benzene and absorbed on a column of 30 g. of alumina. Elution with benzene (900 ml.) and chloroform-benzene (1:9, 500 ml.), followed by crystallization from acetone-hexane, yields 12α-methyl-11β-hydroxyprogesterone 3,20-bis-ethylene ketal (about 660 mg.) melting at about 169–175°. Crystallization from acetone-hexane afford an analytical sample which melts at about 177–170°.

Similarly, by substituting 1 g. of 12α-ethyl-11-ketoprogesterone 3,20-bis-ethylene ketal or 12α-methyl-Δ$^{1,4}$-pregnadiene-3,11,20-trione 3,20-bis-ethylene ketal for the 12α-methyl-11-ketoprogesterone 3,20-bis-ethylene ketal in the procedure of Example C, 12α-ethyl-11β-hydroxyprogesterone 3,20-bis-ethylene ketal and 12α-methyl-Δ$^{1,4}$-pregnadiene-11β-ol-3,20-dione 3,20-bis-ethylene ketal are obtained respectively.

EXAMPLE D

*12α-Methyl-11β-Hydroxyprogesterone*

A solution of 1.4 g. of 12α-methyl-11β-hydroxyprogesterone 3,20-bis-ethylene ketal in 30 ml. of methanol and 3 ml. of 8% sulfuric acid is heated under reflux for one hour. The mixture is diluted with water, the precipitated solid collected and crystallized from chloroform-methanol to give about 1.1 g. of 12α-methyl-11β-hydroxyprogesterone, M.P. about 235–238°. Crystallization from chloroform-methanol gives an analytical sample melting at about 238–240°.

Similarly, 12α-ethyl-11β-hydroxyprogesterone 3,20-bis-ethylene ketal and 12α-methyl-Δ$^{1,4}$-pregnadiene-11β-ol-3,20-dione 3,20-bis-ethylene ketal can be hydrolyzed to 12α-ethyl-11β-hydroxyprogesterone and 12α-methyl-Δ$^{1,4}$-pregnadiene-11β-ol-3,20-dione respectively.

The following examples are illustrative of the invention (all temperatures being in centigrade):

EXAMPLE 1

*12α-Methyl-Δ$^{4,9(11)}$-Pregnadiene-3,20-Dione (I)*

A solution of 1.1 g. of 12α-methyl-11β-hydroxyprogesterone in 21 ml. of dimethylformamide, 2.1 ml. of anhydrous pyridine and 2.1 ml. of mesyl chloride is heated at 75–80° for one hour. The solution is then cooled, diluted with water, and the organic material extracted with chloroform. The chloroform is washed several times with water, dried over sodium sulfate and the solvent removed in vacuo. The residue (about 1.02 g.) is dissolved in 25 ml. of benzene and absorbed in 35 g. of acid-washed alumina. Elution with hexane-benzene (1:1) and benzene followed by crystallization from acetone-hexane yields about 665 mg. of 12α-methyl-Δ$^{4,9(11)}$-pregnadiene-3,20-dione, M.P. about 135–142°. A second crystallization from acetone-hexane affords an analytical sample melting at about 144–145°; $[\alpha]_D = 181°$ (c. 0.89 in $CHCl_3$);

$\lambda_{max}^{alc.}$ 238 m$\mu$ (17,000); $\lambda_{max}^{Nujol}$ 5.85, 5.95, 6.17$\mu$

*Analysis.*—Calcd. for $C_{22}H_{30}O_2$ (326.46): C, 80.93; H, 9.26. Found: C, 80.93; H, 9.30.

Similarly, 12$\alpha$-ethyl-11$\beta$-hydroxyprogesterone and 12$\alpha$-methyl-$\Delta^{1,4}$-pregnadiene-11$\beta$-ol-3,20-dione can be converted to 12$\alpha$-ethyl-$\Delta^{4,9(11)}$-pregnadiene-3,20-dione and 12$\alpha$-methyl-$\Delta^{1,4,9(11)}$-pregnatriene-3,20-dione, respectively.

EXAMPLE 2

*9$\alpha$-Bromo-11$\beta$-Hydroxy-12$\alpha$-Methylprogesterone (II)*

To a solution of 200 mg. of 12$\alpha$-methyl-$\Delta^{4,9(11)}$-pregnadiene-3,20-dione in 20 ml. of dioxane and 11.5 ml. of 0.3 N-perchloric acid is added 125 mg. of N-bromoacetamide. The reaction mixture is allowed to stand in the dark for one hour at room temperature. After adding a few drops of sodium bisulfite solution, the mixture is diluted with chloroform (50 ml.). The chloroform-dioxane solution is washed with aqueous sodium bicarbonate and then with water, dried over sodium sulfate and the solvent removed in vacuo. Trituration of the oily residue with methanol yields about 84 mg. of the bromohydrin which melts at about 125–130° (dec.); $[\alpha]_D + 174°$ (c. 0.57 in $CHCl_3$);

$\lambda_{max}^{alc.}$ 243 m$\mu$ (13,500); $\lambda_{max}^{Nujol}$ 3.00, 5.88, 9.13$\mu$

*Analysis.*—Calcd. for $C_{22}H_{31}O_3Br$ (423.38): C, 62.41; H, 7.38; Br, 18.88. Found: C, 62.51; H, 7.32; Br, 18.34.

EXAMPLE 3

*9$\alpha$-Chloro-11$\beta$-Hydroxy-12$\alpha$-Methylprogesterone (III)*

Following the procedure of Example 2, but substituting 130 mg. of N-chlorosuccinimide for the N-bromoacetamide, there is obtained 9$\alpha$-chloro-11$\beta$-hydroxy-12$\alpha$-methylprogesterone.

EXAMPLE 4

*9$\alpha$-Bromo-11-Keto-12$\alpha$-Methylprogesterone (IV)*

To a solution of 9$\alpha$-bromo-11$\beta$-hydroxy-12$\alpha$-methylprogesterone (44 mg.) in 2 ml. of acetone is added, with stirring, chromium trioxide in 0.67 N-sulfuric acid (200 mg./ml.) until a permanent brown coloration is obtained. The mixture is then stirred for one hour. Dilution with water gives about 31 mg. of the bromoketone melting at about 175–177°. Crystallization from acetone-hexane gives an analytical sample melting at about 154–155° (dec.); $[\alpha]_D + 273°$ (c. 0.50 in $CHCl_3$);

$\lambda_{max}^{alc.}$ 239 m$\mu$ ($\epsilon$ =12,400); $\lambda_{max}^{Nujol}$ 5.88, 5.99, 6.20$\mu$

EXAMPLE 5

*9$\beta$,11$\beta$-Epoxy-12$\alpha$-Methylprogesterone (VII)*

A solution of 9$\alpha$-bromo-11$\beta$-hydroxy-12$\alpha$-methylprogesterone (42 mg.) in 2 ml. of methanol is stirred under nitrogen with 0.18 ml. of 10% aqueous potassium carbonate. The reaction mixture is diluted with water, the precipitated solid collected and crystallized from acetone-hexane. The methyl oxido compound (about 17.3 mg.) so obtained has a melting point of about 125–127°; $[\alpha]_D + 38.6°$ (0.63 in $CHCl_3$);

$\lambda_{max}^{Nujol}$ 5.89, 5.99, 6.16$\mu$

*Analysis.*—Calcd. for $C_{22}H_{30}O_3$ (342.46): C, 77.15; H, 8.83. Found: C, 77.00; H, 8.33.

EXAMPLE 6

*9$\alpha$-Fluoro-11$\beta$-Hydroxy-12$\alpha$-Methylprogesterone (VIII)*

A solution of 60 mg. of 9$\beta$,11$\beta$-epoxy-12$\alpha$-methylprogesterone in 9.5 ml. of chloroform and 0.5 ml. of alcohol is treated at 0° with anhydrous hydrogen fluoride until a substantial layer of hydrogen fluoride has formed. The mixture is kept at 0° for one hour and twenty minutes with stirring and then neutralized by addition of a suspension of sodium bicarbonate in water. After separation of the chloroform layer, the latter is washed with water, dried over sodium sulfate and the solvent removed in vacuo. The residue is dissolved in 5 ml. of benzene and 10 ml. of hexane and the solution chromatographed over a column of 2.2 g. of acid-washed alumina. Elution with 550 ml. of benzene-hexane (1:2) furnishes about 30 mg. of 11$\alpha$,12$\beta$-dimethyl-$\Delta^{4,9(14),13(17)}$-19-norpregnatriene-3,20-dione. Continued elution of the column with 600 ml. of benzene and 400 ml. of benzene-chloroform (9:1) furnishes about 9 mg. of 9$\alpha$-fluoro-12$\alpha$-methyl-11$\beta$-hydroxyprogesterone, which after recrystallization from acetone-hexane has the following properties: M.P. about 228–229°; $[\alpha]_D^{23} + 147°$ (c., 0.32 in $CHCl_3$);

$\lambda_{max}^{Nujol}$ 2.94, 5.90, 6.10, 6.22$\mu$

*Analysis.*—Calcd. for $C_{22}H_{31}O_3F$ (362.46): C, 72.90; H, 8.62. Found: C, 72.97; H, 8.68.

EXAMPLE 7

*9$\alpha$-Chloro-11$\beta$-Hydroxy-12$\alpha$-Methylprogesterone (III)*

To a solution of 25 mg. of 9$\beta$,11$\beta$-epoxy-12$\alpha$-methylprogesterone in 2.5 ml. of chloroform is added at 0°, 0.35 ml. of 0.54 N solution of hydrogen chloride in chloroform. After 72 hours at 0°, chloroform is added and the mixture is extracted with dilute sodium bicarbonate and with water. Evaporation of the solvent in vacuo furnishes a crystalline residue, which after recrystallization from acetone-hexane furnishes pure 9$\alpha$-chloro-11$\beta$-hydroxy-12$\alpha$-methylprogesterone, having the following properties: M.P. about 191–192°; $[\alpha]_D^{23} + 168°$ (c., 0.36 in $CHCl_3$);

$\lambda_{max}^{alc.}$ 240 m$\mu$ ($\epsilon$ =15,900); $\lambda_{max}^{Nujol}$ 2.95, 5.88, 6.03$\mu$

*Analysis.*—Calcd. for $C_{22}H_{31}O_3Cl$ (378.97): C, 69.73; H, 8.24. Found: C, 69.43; H, 8.25.

EXAMPLE 8

*9$\alpha$-Fluoro-11-Keto-12$\alpha$-Methylprogesterone (VI)*

Following the procedure of Example 4, but substituting 9$\alpha$-fluoro-11$\beta$-hydroxy-12$\alpha$-methylprogesterone for the bromo steroid in the example, there is obtained 9$\alpha$-fluoro-11-keto-12$\alpha$-methylprogesterone.

EXAMPLE 9

*9$\alpha$-Chloro-11-Keto-12$\alpha$-Methylprogesterone (V)*

Following the procedure of Example 4, but substituting 9$\alpha$-chloro-11$\beta$-hydroxy-12$\alpha$-methylprogesterone for the bromo steroid in the example, there is obtained 9$\alpha$-chloro-11-keto-12$\alpha$-methylprogesterone.

What is claimed is:

1. A compound selected from the group consisting of steroids of the formula

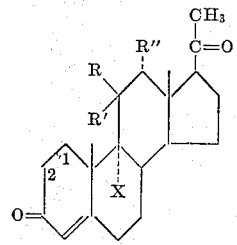

and the 1,2-dehydro derivatives thereof, wherein R is hydrogen, R' is $\beta$-hydroxy, R'' is lower alkyl, and X is halogen.

2. 9$\alpha$-halo-11$\beta$-hydroxy-12$\alpha$-methylprogesterone.
3. 9$\alpha$-chloro-11$\beta$-hydroxy-12$\alpha$-methylprogesterone.
4. 9$\alpha$-fluoro-11$\beta$-hydroxy-12$\alpha$-methylprogesterone.

References Cited in the file of this patent

UNITED STATES PATENTS 2,852,511  Fried _____ Sept. 16, 1958